(No Model.)
G. ENGEL.
DRIVE CHAIN.
No. 558,267. Patented Apr. 14, 1896.
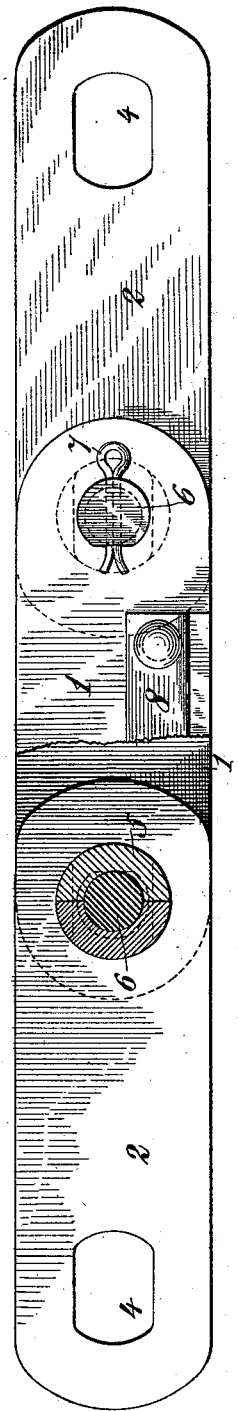
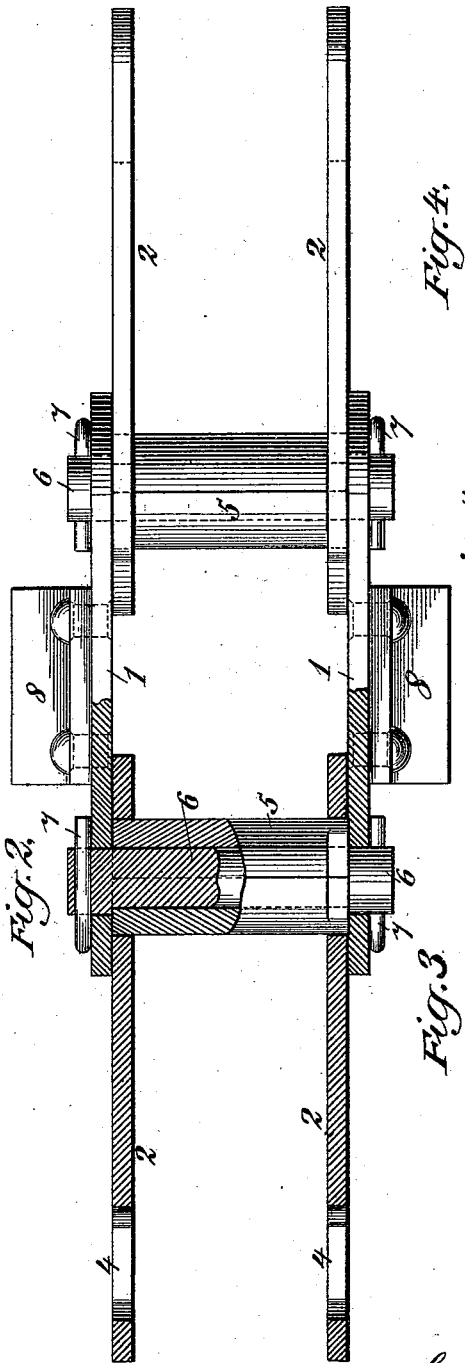
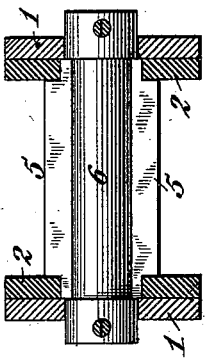
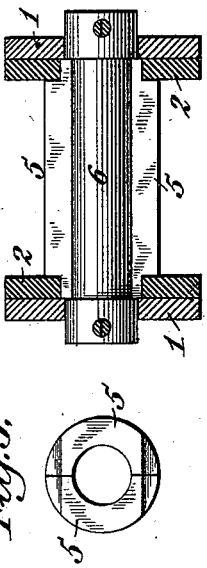
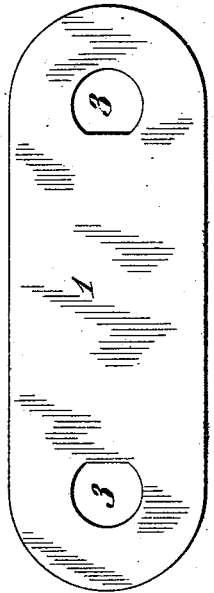
Witnesses:—
Inventor:—
Godfrey Engel
By E. M. Marble & Sons
His Attorneys.

UNITED STATES PATENT OFFICE.

GODFREY ENGEL, OF SOUTH BALTIMORE, MARYLAND.

DRIVE-CHAIN.

SPECIFICATION forming part of Letters Patent No. 558,267, dated April 14, 1896.

Application filed November 21, 1894. Serial No. 529,509. (No model.)

*To all whom it may concern:*

Be it known that I, GODFREY ENGEL, a citizen of the United States, residing at South Baltimore, in the county of Anne Arundel and State of Maryland, have invented certain new and useful Improvements in Drive-Chains; and I do hereby declare the following to be a full, clear, and exact description of the invention, such as will enable others skilled in the art to which it appertains to make and use the same.

My invention relates to chains, and particularly to drive-chains; and my invention consists in the novel forms, construction, and arrangement of the parts constituting my improved chain.

The objects of my invention are, first, to provide a chain in which all of the parts may be simple and easily and cheaply constructed, and which shall combine the maximum of strength with the minimum of weight; second, to construct this chain of as few parts as possible, and to so construct it that it may be put together and taken apart readily; third, to so form the parts of the chain that all may be constructed by rolling, stamping, drop-forging, or similar process of manufacture, thereby making it possible to produce such parts cheaply and accurately, and to construct them of wrought-iron, mild steel, or other similar material which possesses great strenth and elasticity; fourth, to provide means for so locking together the parts of the links that only those parts which are designed to be friction elements can move with respect to each other; fifth, to provide ample bearing and friction surface, so that the friction in the chain may be as small as possible and so that no part may be subjected to excessive stress; sixth, to so form the wearing parts that they may be easily and quickly replaced; and seventh, to so design the chain that it may not be weakened by friction of the parts against the spur-teeth of the wheels about which the chain runs. These objects are attained in the chain herein described, and illustrated in the drawings which accompany and form a part of this application, in which the same reference-numerals indicate the same or corresponding parts, and in which—

Figure 1 is a side elevation of three connected links of my chain, showing particularly the construction of the inside link-pieces, one of the outside link-pieces being broken away in order to show the position of the hereinafter-mentioned fulcrum-pin and bushing when the parts of the links are assembled. Fig. 2 is a plan view and partial section of the chain, the section being taken on the center line of Fig. 1. Fig. 3 is a detail view of an outside link-piece. Fig. 4 is a transverse section of the chain through the center of a fulcrum-pin and bushing, and Fig. 5 is an end view of the bushing.

In my chain the link-pieces are all straight and parallel in the preferred construction herein shown and described, the links being alternately broad and narrow, the difference in width being such that the ends of the broad links may overlap the ends of the narrow links to permit the adjacent links to be connected by fulcrum-pins. In the following description the link-pieces termed "outside" link-pieces will be understood to be the link-pieces of the broader links, while the "inside" link-pieces will be understood to be the link-pieces of the narrower links.

In the drawings, 1 1 are outside link-pieces, the construction of which is clearly shown in Figs. 2 and 3. 2 2 are inside link-pieces, the construction of which is shown in Figs. 1 and 2. The difference between the outside and inside link-pieces consists in the shapes of the holes in the ends of these link-pieces, the holes 3 in the outside link-pieces 1 being adapted to receive the ends of the fulcrum-pins, while the holes 4 in the links 2 are adapted to receive the ends of the bushings which surround the fulcrum-pins.

5 5 are the bushings, and 6 6 are the fulcrum-pins which lie within these bushings. The ends of the bushings fit into the holes 4 of the link-pieces 2, while the ends of the fulcrum-pins fit into the holes 3 3 of the link-pieces 1, stress being communicated from one link-piece to the adjacent link-piece through the ends of the fulcrum-pin and bushing by which those link-pieces are connected. It is desirable, therefore, to have the ends of the pins and bushings of considerable size, so that there may be sufficiently large bearing-surfaces between the ends of the pins and bushings and the links to avoid excessive stress being applied at any one point. The ends of the bushings are amply large for this purpose, but in order to provide sufficient bearing-surface between the ends of the pins and the outside link-pieces I prefer to form the pins with enlarged heads, which project beyond the ends of the bushing. In order to place a bushing upon its pin, therefore, it is necessary that the bushing shall be formed in two parts, as shown in Figs. 1, 2, and 5.

In order to hold the parts constituting each link rigid with respect to each other, and so to prevent movement of the parts and unnecessary friction, it is desirable that both the pin and bushing be prevented from turning within the link-pieces with which they are connected, and that all the movement and friction shall occur between the bushing and the fulcrum-pin. For this purpose, therefore, the ends of pin and bushing are made non-cylindrical in form, and the holes in the link-pieces into which these ends fit have corresponding outlines, so that it is impossible for either pin or bushing to turn within the ends of the link-pieces into the holes in which it fits.

The preferred form of the ends of the bushings is shown in Fig. 5 and in plan in Fig. 2, the ends being flattened on two opposite sides. The preferred form of the ends of the fulcrum-pins is shown in Fig. 1, the enlarged heads of the pins being flattened on one side.

The ends of the pins 6 are provided with suitable holes for the reception of split pins or cotters, which prevent the link-pieces from slipping out of place.

The method of assembling the parts of the chain is as follows: Two outside link-pieces are placed side by side, and two fulcrum-pins, surrounded by bushings, are passed through the holes in the ends of the link-pieces, the ends of the bushings fitting snugly within the holes 4 4 in the ends of the link-pieces, so that it is impossible for the bushings to turn with respect to the link-pieces. One inside link is thus completed. A second inside link is put together in a similar manner and is placed in line with and a short distance from the first link. Two outside link-pieces are then placed upon the ends of the adjacent fulcrum-pins, the forms of the heads of the pins and the holes 3 of the link-pieces preventing the pins from turning with respect to the outside link-pieces after these parts are in place. Split pins or cotters are then inserted in the ends of the pins 6, and thus a set of links are joined together. Other links may be joined on in a similar manner and any desired length of chain may be produced.

It will be noted that in the chain thus described the only parts between which friction can occur are the pins and bushings, and the friction-surfaces of these parts may be made so large that the wearing of the pins and bushings due to friction will be very slight indeed. The bushings may be made of as great thickness as desired, so that the friction of the bushings against the teeth of the wheels about which the chain runs may have reduced the diameter of the bushings very greatly before they will be less strong than the other parts of the chain. Also, when the pins and bushings are worn they may be replaced easily and quickly.

Buckets or other articles may be attached to the links of the chain by means of angle-plates 8 8, attached to the link-pieces, as shown in Figs. 1 and 2.

It is obvious that the method of connecting adjacent links herein described may be applied equally well to the familiar type of built-up chains in which all of the links are of the same size and construction, one end of each link being narrower than the other in order that it may fit into the wide end of an adjacent link. The method of applying the pins and bushings to this type of chain is obvious and needs no description.

Having thus completely described my invention, what I claim, and desire to secure by Letters Patent, is—

1. In a chain, the combination, with fulcrum-pins adapted to connect adjacent links, and having on their ends enlarged heads, whereby the bearing-surfaces on the ends of said pins are increased, of bushings surrounding said pins and fitting between the enlarged heads thereof, link-pieces fitting on the ends of said bushings, and other link-pieces fitting on the ends of said pins, substantially as described.

2. In a chain, the combination, with fulcrum-pins adapted to connect adjacent links, and having on their ends enlarged heads, whereby the bearing-surfaces on the ends of said pins are enlarged, of bushings surrounding said pins and fitting between the enlarged heads thereof, link-pieces fitting on the ends of said bushings, other link-pieces fitting on the ends of said pins, and means for preventing said pins from turning with respect to their respective link-pieces, substantially as described.

3. In a chain, the combination, with fulcrum-pins adapted to connect adjacent links, and having on their ends enlarged heads, whereby the bearing-surfaces on the ends of said pins are increased, of split bushings surrounding said pins and fitting between the enlarged heads of said pins, link-pieces fitting on the ends of said bushings, and other link-pieces fitting on the ends of said pins, substantially as described.

4. In a chain, the combination, with fulcrum-pins adapted to connect adjacent links, and having enlarged cylindrical ends whereby the bearing-surface on the ends of said pins is increased, said ends being flattened upon one side, of bushings surrounding said pins, link-pieces fitting on the ends of said bushings, means for preventing said bushings from turning with respect to said link-pieces, and other link-pieces fitting on the ends of said pins and having holes for the reception of the ends of said pins corresponding in shape to the said ends, whereby said pins are prevented from turning with respect to their respective links, substantially as described.

5. In a chain, the combination, with fulcrum-pins adapted to connect adjacent links, bushings surrounding said pins, link-pieces fitting upon the ends of said bushings, and means for preventing said bushings from turning with respect to said link-pieces, of other link-pieces fitting upon the ends of said pins, means for preventing said pins from turning with respect to said last-named link-pieces, and split pins or cotters adapted to enter holes in the ends of said pins and to hold said link-pieces in place, substantially as described.

In testimony whereof I affix my signature in presence of two witnesses.

GODFREY ENGEL.

Witnesses:
VICTOR K. MCELHENY, Jr.,
ARTHUR KRAUSE.